United States Patent [19]
Gawron et al.

[11] Patent Number: 5,893,768
[45] Date of Patent: Apr. 13, 1999

[54] SELF-ALIGNING CONNECTION SYSTEM

[75] Inventors: Steven Gawron, Dearborn; Brenda R. Koehler, Redford; Lawrence M. Suwinski, Clinton Township; John N. Topolewski, Westland, all of Mich.

[73] Assignee: UT Automotive Dearborn, Inc., Dearborn, Mich.

[21] Appl. No.: 08/768,725

[22] Filed: Dec. 18, 1996

[51] Int. Cl.⁶ .................................................. H01R 13/64
[52] U.S. Cl. .......................... 439/248; 439/571; 296/152
[58] Field of Search ........................... 439/34, 247, 248, 439/571, 573; 296/146, 152, 39.1

[56]  References Cited

U.S. PATENT DOCUMENTS

| | | | |
|---|---|---|---|
| 4,800,648 | 1/1989 | Nakayama et al. | 28/854 |
| 4,848,829 | 7/1989 | Kidd | 296/152 |
| 5,197,896 | 3/1993 | Landis et al. | 439/247 |
| 5,385,481 | 1/1995 | Kotyuk | 439/248 |
| 5,667,398 | 9/1997 | Kidd et al. | 439/248 |

FOREIGN PATENT DOCUMENTS

| | | |
|---|---|---|
| 534659A2 | 9/1992 | European Pat. Off. . |
| 2609844 | 1/1987 | France . |

Primary Examiner—Neil Abrams
Assistant Examiner—Brian J. Biggi
Attorney, Agent, or Firm—Howard & Howard

[57] ABSTRACT

Vehicle doors generally include a metal door frame connected to an interior trim panel. Electrical connections are made between trim panel electrical connectors, and mating electrical connectors on the door frame. A self-aligning connection system allows one of the connectors to float or aligns with the mating electrical connector by being allowed to move in three directions during assembly. The connection system includes a carriage (46) having a hole, a clip (48), and a base (44). The clip releasably holds one electrical connector (50). The clip (48) is disposable within the carriage (46) so that the clip moves along a first axis and a second axis within the carriage. The base comprises a plate (53) and at least one post (54) extending from the plate. The carriage is placed on the post so that the post extends through the hole. The diameter of the post allows the carriage to be slidably engaged therewith along a third axis. The self-aligning connection system allows the connectors to move in three axises or directions relative to one another. As a result, the connectors self-align with the complementary connectors, and can be mated without the operator'hands on the connectors or seeing the connection.

10 Claims, 2 Drawing Sheets

SELF-ALIGNING CONNECTION SYSTEM

TECHNICAL FIELD

The present invention relates to a vehicle door wiring system, and more particularly to a self-aligning connection system for making the electrical connections within the vehicle door wiring system.

BACKGROUND OF THE INVENTION

Vehicle doors generally include a metal door frame connected to an interior trim panel. A wire harness is attached to the door frame and one is attached to the trim panel. One wire harness includes a plurality of female connectors and the other includes a plurality of male connectors. In order to complete a circuit each of the female connectors must be mated with the corresponding male connectors. In this way, electrical signals may be communicated between components on the door and accessories remote from the door.

Currently, an assembler is required to properly mate the connectors prior to the trim panel being mounted to the door frame. The door frame and trim panel must be close enough to mate the connectors. The assembler must reach around the trim panel and into the narrow space between the door frame and trim panel to make these connections. Since the assembler cannot see the connections as they are being made the whole process becomes not only cumbersome and inconvenient, but also problematic.

The first problem is that the electrical connection is unsatisfactory and unwarranted. As a result of a poor connection, some or all of the affected electrical components may work sporadically if at all. This may result from the assembler achieving a partial connection or damaging a terminal or the terminals pushing out during assembly.

The second problem is that during assembly, the assembler may need to pull on the wires in order to make and/or check connections. This may damage or cut wires, which in turn can affect the performance of the electrical components.

The third problem is that the mated connectors may be free to move within the door, which results in undesirable noise during vehicle use. Furthermore, in a manufacturing setting minimizing assembly time of the panel to the door frame is desired. The current process does not keep the assembly time to the desired level since it is an extremely difficult operation.

Systems have been proposed wherein plug-in electrical connections are completed as the trim panel is being moved towards the door. Since this would not require the assembler to reach around the panel, this would be an improvement. However, such systems have required exact alignment between the two electrical connectors, which is difficult to achieve. Thus, these systems have not been proven practically successful.

Therefore, a connector is sought, which does not require precise alignment to be connected while assembling a door of a vehicle.

SUMMARY OF THE INVENTION

Vehicle doors generally include a metal door frame connected to an interior trim panel. According to the present invention, electrical connections are made between trim panel electrical connectors, and mating electrical connectors on the door frame. One of the connectors "floats" or aligns with the mating electrical connector by being allowed to move in three directions.

In one embodiment bases are secured to the interior surface of the trim panel at various locations. The base comprises a plate, and at least one post extending from the plate. The post includes a ridge and a slot. The ridge is spaced from the plate. The slot extends along said length of the post.

The base is for use in a connection system, which includes a carriage having at least one hole therethrough. The carriage is mounted on the base so that it can move in one direction. The carriage is placed on the base post, so that the post extends through the hole. The slot allows the post to contract so that the carriage can pass over the ridge, the ridge then retains the carriage on the post. The diameter of the post allows the carriage to be slidably engaged therewith.

According to one embodiment, the base is a part of a self-aligning connection system for use with an electrical connector. The connection system includes a carriage having a hole, a clip, and the base. The clip releasably holds one electrical connector. The clip is disposable within the carriage so that the clip moves along a first axis and a second axis within the carriage. The base comprises a plate, at least one post extending from the plate. The post includes a ridge and a slot. The ridge is spaced from the plate. The slot extends along said length of the post. The carriage is placed on the post, so that the post extends through the hole. The slot allows the post to contract so that the carriage can pass over the ridge, the ridge then retains the carriage on the post. The diameter of the post allows the carriage to be slidably engaged therewith along a third axis. The self-aligning connection system allows the connectors to move in three axises or directions relative to one another. As a result, the connectors self-align with the complimentary connectors, and can be mated without the operator's hands on the connectors or seeing the connection.

The foregoing invention will become more apparent in the following detailed description of the best mode for carrying out the invention and in the accompanying drawings.

BEST MODE FOR CARRYING OUT AN EMBODIMENT OF THE INVENTION

Figure 1:
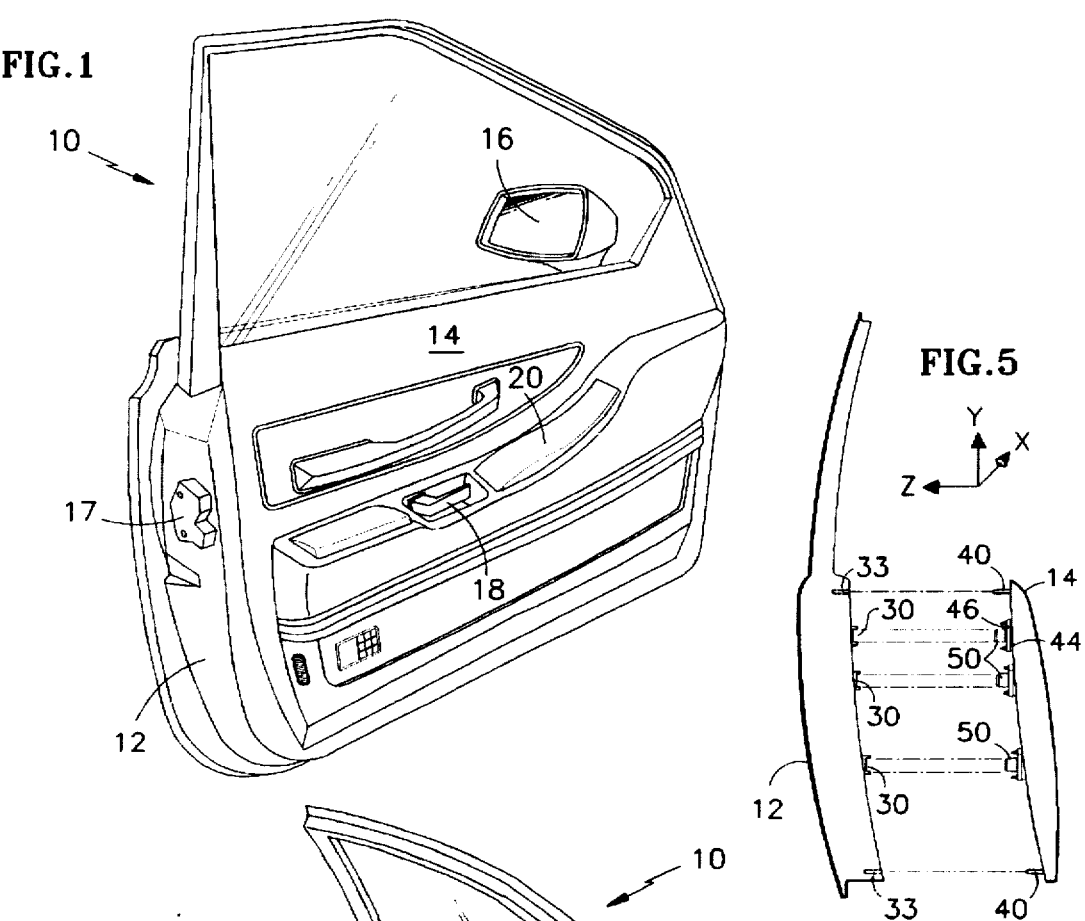
FIG. 1 is a partial perspective view of a fully assembled automobile door interior.

Referring to FIG. 1, a typical automobile door 10 includes a door frame 12 supporting an interior trim panel 14.

The door frame 12 provides structural support for the panel 14, and impact protection for the passengers. The exterior of the door frame 12 is typically designed to house a mirror 16, and a door lock 17. In current practice, a number of electrical and mechanical components are usually preassembled on the interior door frame 12, the trim panel 14, and the vehicle interior.

Figure 2:
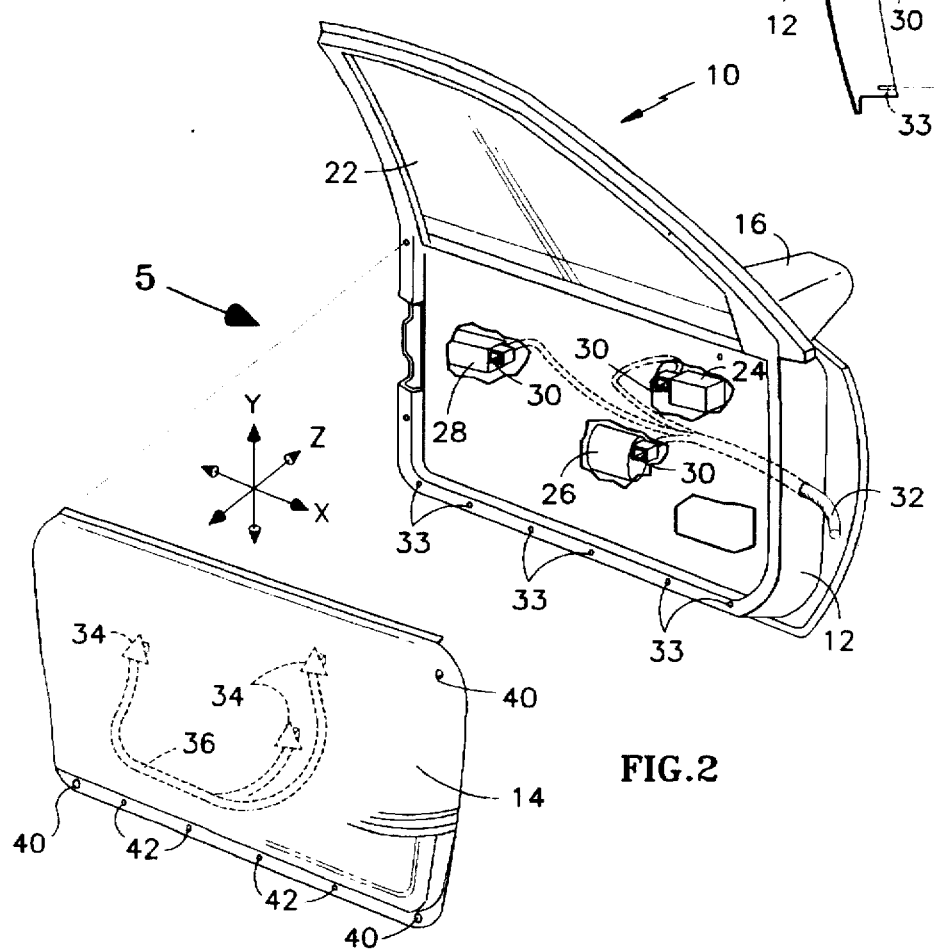
FIG. 2 is a perspective, exploded schematic view of the door in FIG. 1.

The interior trim panel 14 presents a finished, aesthetically pleasing surface and usually includes a door handle 18, and an electrical control panel 20 for actuating a window 22 (as shown in FIG. 2).

Referring to FIG. 2, as an example, a window motor 26, door latch 28, and a mirror motor 24, are received in the door frame 12. The electric components 24, 26, and 28 are provided with male connectors 30 fixed at set locations. A wire harness 32 electrically interconnects the connectors 30 and is mounted within the frame 12. The periphery of the door frame has multiple holes 33 formed therein.

On the trim panel 14, electric components, such as a mirror actuator (not shown), the electronic control panel 20 (as shown in FIG. 1), and a door latch switch (not shown) have associated therewith a connection system 34 (as shown in phantom). Each connection system 34 is mounted on the interior surface of the panel 14. A wire harness 36 electrically interconnects the connection systems 34 and is mounted on and carried by the trim panel 14. A plurality of alignment pins 40 and fasteners 42 are disposed about the periphery of the trim panel 14.

Mechanical components, such as a window lift mechanism and a door latching mechanism, which are supported by the trim panel 14 have been removed for clarity. The details of the electric components, mechanical components and circuitry are as known in the art.

Typically, the reference axis system associated with the door 10 has an x-axis, a y-axis, and a z-axis. The x-axis of the system extends across the width of the door 10, and is represented by an arrow X. The y-axis of the system extends across the height of the door 10, and is represented by an arrow Y. The z-axis of the system extends perpendicular to the door across the width of the car, and is represented by an arrow Z.

Figure 3:
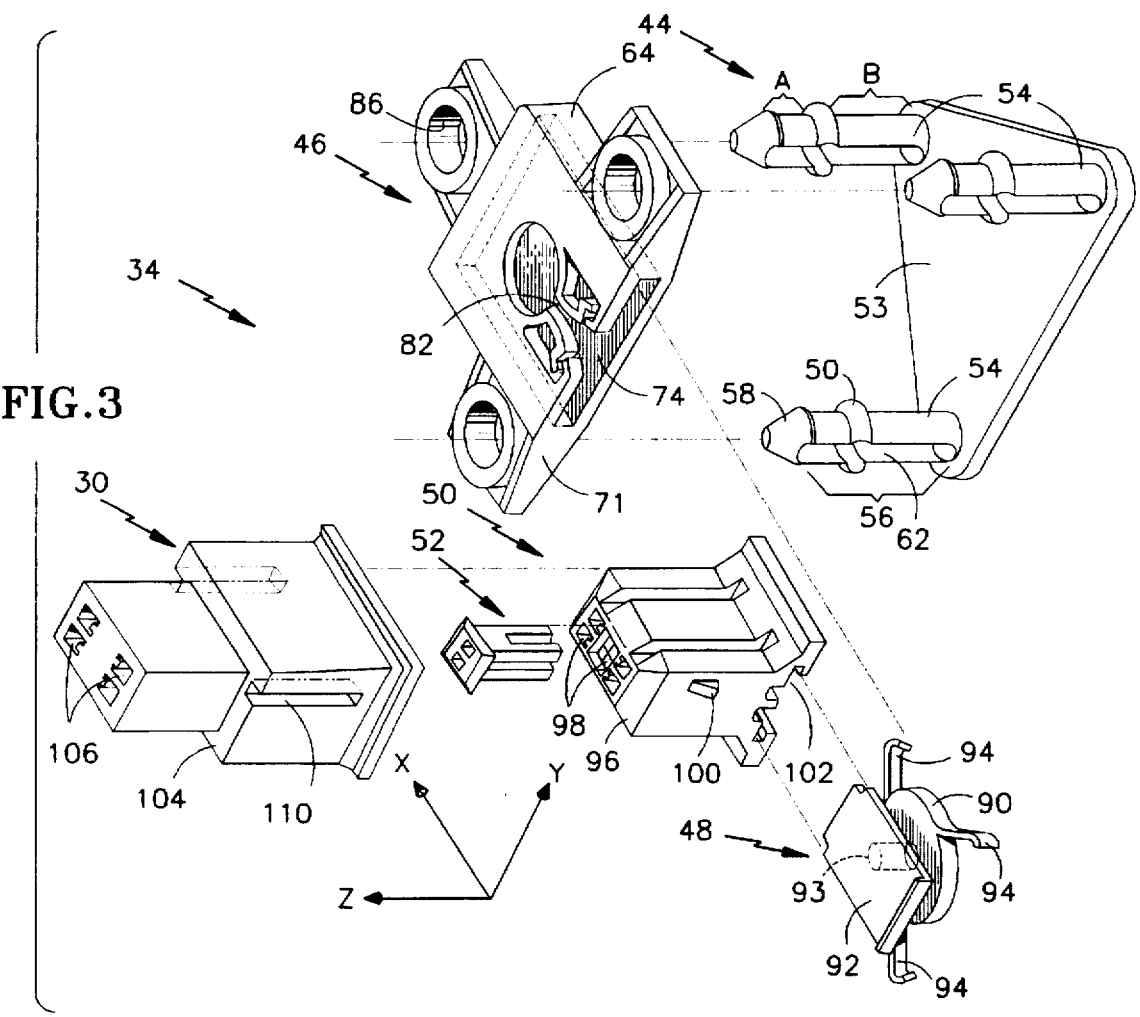
FIG. 3 is an enlarged exploded view of a connection system of the of the present invention.
Figure 4:
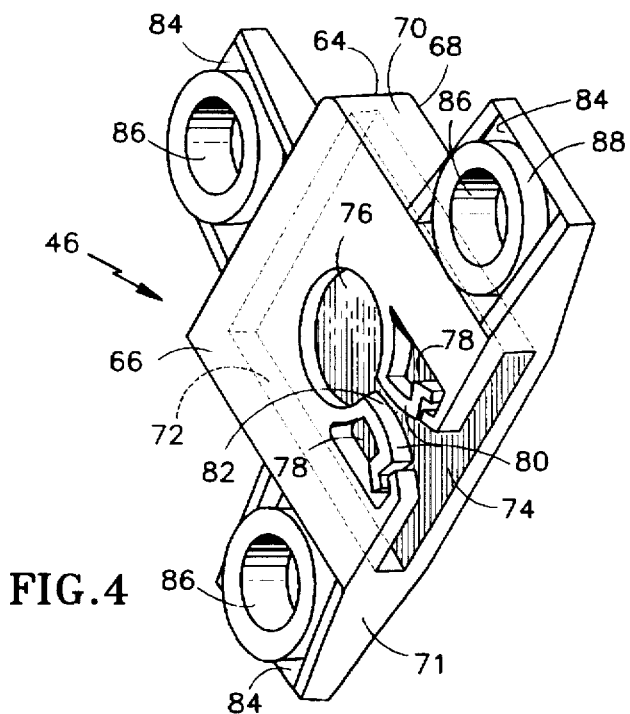
FIG. 4 is an enlarged view of a base of the present invention.

Referring to FIGS. 3 and 4, the connection system 34 includes a base 44, a carriage 46, a retaining clip 48, a female connector 50, and a wedge 52.

The base 44 removably retains the components of the connection system 34. The base 44 is positively retained to the trim panel 14. The base 44 can be mounted using sonic or ultrasonic welding or molded integral with the trim panel 14.

The base 44 includes a triangular plate 53 and three posts 54 extending adjacent each corner of the plate 53. Each post 54 includes a cylindrical portion 56 capped with a conical tip 58.

The cylindrical portion 56 includes a ridge 60 and a slot 62. The ridge 60 circumscribes the cylindrical portion 56, and has two angled surfaces which join together. The ridge 60 geometry is determined analytically and the amount of material interference, the flexural modulus of the material, and friction between the two parts should be considered in order for the system to operate as will be discussed infra.

The slot 62 extends along the length of the cylindrical portion 56 up to the tip 58. The cylindrical post has two zones. The first zone A is between the tip 58 and the ridge 60. The second zone B is between the ridge 60 and the plate 53.

Referring to FIG. 4, the carriage 46 is substantially T-shaped and includes a box 64. The box 64 is formed by a square first face 66, a second face 68 spaced from the first face, and a plurality of integral sidewalls 70 which extend between and join the faces 66 and 68.

The box 64 further includes a square cavity 72 therein (shown partially in phantom). The cavity 72 has an opening 74 through the first sidewall 71.

The first face 66 of the box 64 has a centrally disposed hole 76 and two cutouts 78 disposed between the hole 76 and the first sidewall 71. Two flexible fingers 80 form a portion of the circumference of the hole 76 adjacent the cutouts 78. The fingers are shaped to converge to form a passage 82 into the hole 76 and diverge to extend into the cutouts 78.

The carriage 46 further includes three arms 84. One arm extends from the second, third and fourth sidewalls of the box 64. Each arm 84 forms a hole 86, which may have a tube 88 (as shown in FIG. 3) extending therefrom. The tube 88 minimizes the amount of angularity between the posts 54 and each arm 84, which in turn will reduce a binding condition between the base 44 and the carriage 46.

The retaining clip 48 includes a platform 90, a top 92, and a cylindrical post 93 (shown in phantom) joining the platform 90 and the top 92. The platform 90 includes four flexible legs 94. The legs 94 are spaced from one another and extend from the platform 90 to form substantially an X-shape.

The female connector 50, wedge 52, and the male connector 30 are commercially available. The female connector 50 includes a housing 96 with internal channels 98, two tabs 100 (only one being shown), and a cutout 102.

The channels 98 extend along the length of the housing 96. Each channel 98 is configured to receive a female terminal (not shown) having a wire attached thereto.

Each tab 100 projects from the associated sidewall of the housing 96. The cutout 102 extends along the lower surface of the housing 96, and provides a positive stop for the clip top 92.

The wedge 52 is constructed to fit into the internal channels 98 in the female connector 50, in order to secure the terminals therein.

The male connector 30 includes a housing 104, cavities 106, and two ribs 110. The cavities 106 extend along the length of the main body portion of the housing. Each cavity 106 receives a male terminal (not shown) having a wire attached thereto. Each male terminal partially extends into the inside of the housing 104.

The inside walls of the housing 104 has the ribs 110 (shown in phantom) extending along the length. The components of the connection system 34 may be molded from plastic.

Use of the connection system 34 will now be discussed. Referring to FIG. 2, within the assembly plant the preassembled door frame 12 having the electrical components shown is located on the vehicle. The trim panel 14 has the bases 44 (as shown in FIG. 3) coupled thereto.

The wire harness 36 is formed having the female connectors 50 (as shown in FIG. 3) attached thereto. Each connector 50 has the four required terminals (not shown) secured therein with the wedge 52. In order to make a connection between the male connector 30 on the door frame 12 and the female connector 50 on the panel 14, the connection systems 34 must be assembled.

Referring to FIG. 3, the retaining clip 48 is loaded into the female connector 50 by sliding the clip top 92 into the connector cutout 102.

Next the clip 48 is engaged with the carriage 46 by sliding the platform 90 of the clip 48 into the cavity 72 via the opening 74. During installation the post 93 of the clip 48 passes through the passage 82. The flexible fingers 80 move into the cutouts 78 to allow the post to enter the hole 76. Once the clip post 93 is within the hole 76, the legs 94 allow the clip 48 and the female connector 50 to float or move along the x-axis and the y-axis. The legs 94 also hold the clip 48 centrally within the carriage 46 even when the panel 14 is moved or turned.

Now, the carriage 46 is placed on the base 44 adjacent the tip 58. This is done by inserting the posts 54 through the holes 86 in the carriage 46. This is the initial position of the carriage 46. The carriage 46 is within the first zone A of the posts 54. The diameter of the posts is greater than the diameter of the holes in the carriage, so that the force required to collapse the ridge 60 into the slot 62 is greater than the force of insertion of the female connector 50 to the male connector 30.

Figure 5:
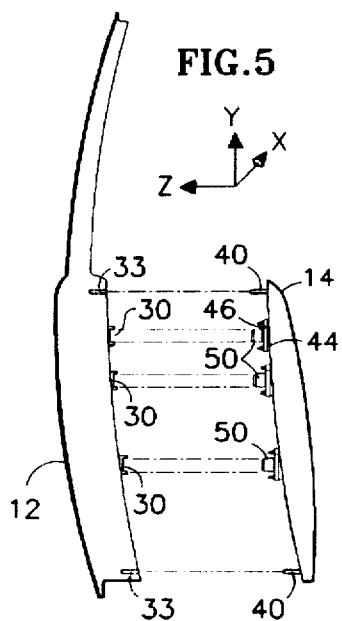
FIG. 5 is a left side view along line 5 in FIG. 2 of the door.

Referring to FIG. 3 and 5, the assembler is ready to join the panel 14 to the door frame 12. The alignment pins 40 are placed within the holes 33, which allows the panel 14 to be positioned relative to the door frame 12. When the assembler moves the panel 14 toward the frame 12 along the z-axis, the female connectors 50 come into contact with the male connectors 30. The floating of the female connectors 50 along the x-axis and the y-axis due to the clip 48 and carriage 46 arrangement allows the female connectors 50 to self-align with the male connectors 30 until the female connector 50 enters the housing 104 in each of the associated male connectors 30. As the panel 14 continues to move the tabs 100 enter the slots 110. Once a connector mating force is exceeded, the tabs 100 move past the protrusions (not shown) in the slots 110, and the connectors 30 and 50 are held together by the retaining tabs 100.

The assembler continues to apply force on the panel 14, until a carriage assembly force is exceeded. As the carriage assembly force is approached, the slots 62 in the base posts 54 allow the posts 54 to contract until the diameter of the posts at the ridges 60 is small enough to allow the carriage 46 to move over the ridges 60 and rest adjacent the plate 53 in a final position. In the final position, the carriage 46 is within the second zone B of the posts. The diameter of the posts is less than the diameter of the holes, so that the carriage can slide along the posts 54 along the z-axis as needed. The panel 14 is secured to the frame 12 and all the electrical connections have been made.

Referring to FIGS. 2 and 3, during operational movement of the vehicle and even opening and closing of the door, the panel 14 may experience a relative movement or deformation especially with respect to the frame 12. The door's connector separation force is the force required to unlatch the male connectors 30 from the female connectors 50. The carriage detachment force is the force required to remove the carriage 46 from the base 44. The carriage detachment force is greater than the connector separation force. Both these forces are greater than those encountered during vehicle operation. Thus, as a result of the connection system 34, the panel 12 can move in the x-direction, y-direction and z-direction without affecting the connectors.

In order to remove the trim panel 14 for repair or inspection, the worker separates the panel 14 from the frame by pulling the panel 14 off of the frame 12. Force is applied to remove the fasteners 42 from the holes 33. The worker exceeds the connector separation force before the carriage detachment force. Thus the connectors 30 and 50 will separate before the carriage 46 leaves the base 44. As a result, the female connectors 50 and the wiring associated therewith remain connected to the trim panel 14. The carriage 46 remains in the final position. If the carriage assembly force was less than the connector separation force, the carriage 46 would separate from the base 44 prior to the connectors 30 and 50 separating from each other, and the wire harness 36 would be pulled from the trim panel 14.

Once the panel 14 is removed, the clip 48 can be slid from engagement with the carriage 46. Referring to FIG. 3, during removal of the clip 48 the post 93 contacts the fingers 80, and the fingers 80 flex outward into the cutouts 78 allowing the clip 48 to be disengaged from the carriage 46. The female connectors 50 can be slid from engagement with the clip 48, and the necessary repairs can be performed.

Prior to reinstalling the panel 14, the carriage 46 must be returned to the initial position in zone A. This is done by manually forcing the carriage 46 over the ridges 60 on the posts 54 of the base 44. If the carriage 46 is allowed to remain in the final position during reinstallation, the connectors 30 and 50 will not lock together.

The principal advantage of the connection systems is that the trim panel can be easily attached to the door frame, and although the operator cannot see the connectors, a good connection is achieved without pulling, damaging or cutting the wires. This advantage is due to the connection system allowing the connectors to move in three directions during installation of the panel.

Another advantage of the present invention is that the during operation of the vehicle noise due to movement of the connectors is minimized. Noise is minimized because the connectors cannot move into contact with the trim panel or door frame during operation. If the panel needs to adjust in the z-direction the carriage moves along the posts of the base. Thus, metal to metal rubbing is replaced with plastic to plastic rubbing.

Yet another advantage is that the assembly time required to connect a panel to a door frame is significantly decreased. The assembly time is reduced to the time it takes to position the panel with respect to the door frame and snap the panel into place. Once the fasteners are secured within the frame the connection has been achieved.

While a particular invention has been described with reference to illustrated embodiments, various modifications of the illustrative, embodiments, as well as additional embodiments of the invention, will be apparent to persons skilled in the art upon reference to this description without departing from the spirit and scope of the invention, as recited in the claims appended hereto. It is therefore contemplated that the appended claims will cover any such modification or embodiments that fall within the true scope of the invention.

We claim:

1. A base for use in an electrical connector with a carriage having at least one hole therethrough, said base comprising:

a triangular plate;

three posts extending from each corner of said plate, said posts including
  a ridge disposed between said plate and a free end of said post, said ridge for retaining the carriage on said post; said ridge having a conical cross-section;

a slot extending along said length of said post; said slot for allowing the carriage to pass over said ridge;

a diameter which allows carriage to be slidably engaged therewith; and a conical tip at said free end of said post.

2. The base of claim 1, wherein the ridge is shaped so that a force required to pass the carriage over the ridge is a predetermined amount.

3. A connection system as recited in claim 1, wherein said opening to said carriage has a entrance portion which may be expanded outwardly to allow passage of said clip into said opening.

4. A connection system as recited in claim 3, wherein said opening includes a pair of opposed spring fingers which are normally in a position blocking access to said opening, but which may be forced away from said blocking position to allow passage into said opening of said clip.

5. A connection system for use with an electrical connector, said connection system comprising:

a carriage having an opening;

a clip for releasably holding the electrical connector, said clip being disposed within said carriage so that said clip moves along a first axis and a second axis within the carriage; and a base including
  a plate;
  at least one post extending from said plate, said post including
    a ridge disposed between said plate and a free end of said post, said ridge for stopping movement of the carriage on said post when said carriage opening is moved onto said post;
  a slot extending along said length of said post; said slot for allowing the carriage to pass over said ridge; and
  a diameter which allows said carriage to be slidably engaged therewith along a third axis.

6. The connection system of claim 5, wherein the ridge is shaped so that a force required to pass the carriage over the ridge is a predetermined amount.

7. The connection system of claim 6, wherein the plate is substantially triangular in shape; and said base further includes three posts one extending from each corner of said triangular plate.

8. The connection system of claim 7, wherein said free end of said posts further include conical tips.

9. The connection as set forth in claim 5, wherein said clip being slid into an opening in said carriage, and said clip being moveable within said carriage.

10. A trim panel comprising:

a trim panel;

an electrical connector connected with a clip portion;

a carriage portion;

a base fixed to said trim panel, said base including a plate, and at least one post extending from said plate, said post having a ridge between said plate and a free end of said post, and a slot extending along a length of said post, said slot facilitating radially inward movement of said post; and said carriage being received on said post, said carriage having an opening for movement along said post, said opening having an inner diameter which is smaller than an outer diameter of said ridge such that said ridge normally blocks further movement of said carriage, however upon sufficient force being applied to said carriage, said ridge moving inwardly as facilitated by said slot to allow said carriage to move further down said post, said clip and said connector being received in an opening in said carriage, said clip and said connector being moveable within at least two dimensions in said space in said carriage to facilitate alignment of said connector with a main connector.

* * * * *